(12) United States Patent
Pentia

(10) Patent No.: US 12,741,607 B2
(45) Date of Patent: Sep. 22, 2026

(54) BUMPER AND BUMPER MODULAR SYSTEM

(71) Applicant: Dr. Ing. h.c. F. Porsche Aktiengesellschaft, Stuttgart (DE)

(72) Inventor: Bogdan Pentia, Ostfildern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 430 days.

(21) Appl. No.: 18/474,443

(22) Filed: Sep. 26, 2023

(65) Prior Publication Data

US 2024/0132008 A1 Apr. 25, 2024
US 2024/0227713 A9 Jul. 11, 2024

(30) Foreign Application Priority Data

Oct. 19, 2022 (DE) ..................... 10 2022 127 406.3

(51) Int. Cl.
*B60R 19/48* (2006.01)
*B60L 53/16* (2019.01)

(52) U.S. Cl.
CPC .............. *B60R 19/48* (2013.01); *B60L 53/16* (2019.02)

(58) Field of Classification Search
CPC .... B60K 2015/0515; B60K 2015/0538; B60K 2015/0523
See application file for complete search history.

(56) References Cited

U.S. PATENT DOCUMENTS

| | | | | |
|---|---|---|---|---|
| 9,744,914 | B2 * | 8/2017 | Barthel | B60R 11/04 |
| 2015/0102627 | A1 * | 4/2015 | Pickartz | B60K 15/05<br>296/97.22 |
| 2016/0137081 | A1 | 5/2016 | Takahashi et al. | |

FOREIGN PATENT DOCUMENTS

| | | | |
|---|---|---|---|
| CN | 213768277 | U | 7/2021 |
| DE | 102011004834 | A1 | 8/2012 |
| DE | 102011108817 | A1 | 8/2012 |
| DE | 102015206715 | A1 | 10/2016 |
| DE | 102020004105 | A1 | 9/2020 |
| DE | 102020130235 | A1 | 5/2022 |

* cited by examiner

*Primary Examiner* — Nicholas McFall
(74) *Attorney, Agent, or Firm* — Buchanan Ingersoll & Rooney PC

(57) ABSTRACT

A bumper with a charging port which is closable by a cover that is, by way of a combined drive-and-guide device arranged in the bumper, movable between a closed position in which the charging port is covered by the cover and an open position in which the charging port is exposed by the cover. In order to simplify the manufacture of bumpers, the combined drive-and-guide device is fastened on the bumper to a unit fastening point of an individually customized adapter frame facing the combined drive-and-guide device.

8 Claims, 5 Drawing Sheets

BUMPER AND BUMPER MODULAR SYSTEM

CROSS-REFERENCE TO RELATED APPLICATION

This application claims priority to German Patent Application No. 10 2022 127 406.3, filed Oct. 19, 2022, the content of such application being incorporated by reference herein in its entirety.

FIELD OF THE INVENTION

The invention relates to a bumper with a charging port with a cover that is, by means of a combined drive-and-guide device arranged in the bumper, movable between a closed position in which the charging port is covered by the cover and an open position in which the charging port is exposed by the cover. The invention further relates to a bumper modular system.

BACKGROUND OF THE INVENTION

Chinese utility model specification CN 213768277 U, which is incorporated by reference herein, discloses an electric vehicle with a charging tray module arranged on a bumper, wherein a charger cover is pivotable outwardly from a closed position into an open position. German publication DE 10 2020 130 235 A1, which is incorporated by reference herein, discloses an engine-powered cover apparatus for covering and exposing a charging port arranged on the body of an electric vehicle in relation to a vehicle outer region with a body opening that can be covered by a charger cover, wherein the charger cover is arranged in an open position (not visible) behind a body element comprising the body opening. German publication DE 10 2015 206 715 A1, which is incorporated by reference herein, discloses an apparatus for opening and closing a charger cover of a vehicle, wherein the charger cover covers a charging compartment arranged within the outer skin of the vehicle, in which a charging socket is arranged, wherein the charger cover is arranged within the charging compartment in the open state and is guided on a guidance means arranged within the charging compartment such that it can be pushed underneath the outer skin surrounding the charging compartment opening in the manner of a sliding door. American publication US 2016/0137081 A1, which is incorporated by reference herein, discloses a charger cover that is split in two, with two separately displaceable charger cover elements, thereby enabling a body opening to be fully or only partially exposed. A charging terminal arrangement of an electric vehicle, with a first housing part and a second housing part, wherein the second housing part is vehicle-specific and can be fastened to a vehicle-specific body element such that the second housing part serves as an adapter, wherein the uniformly arranged first housing part can be fastened to the second fastening element, is known from the German publication DE 10 2020 004 105 A1, which is incorporated by reference herein. German publications DE 10 2011 004 834 A1 and DE 10 2011 108 817 A1, which are each incorporated by reference herein, disclose charging devices for electric vehicles with adapter plates for the assembly of standardized electrical connectors on arbitrary motor vehicle bodies.

SUMMARY OF THE INVENTION

In a bumper with a charging port closable by a cover that is, by means of a combined drive-and-guide device arranged in the bumper, movable between a closed position in which the charging port is covered by the cover and an open position in which the charging port is exposed by the cover, the combined drive-and-guide device being fastened in the bumper to a unit fastening point of an individually customized adapter frame facing the combined drive-and-guide device. Using the individually customized adapter frame, the same combined drive-and-guide device can advantageously be mounted in various types of bumpers. The cover is is advantageously arranged in its opening position in the bumper offset from the charging port. The cover is movable with the combined drive-and-guide device from its closed position into the bumper. By means of the claimed design of the bumper having the individually customized adapter frame, the provision of various bumpers with a charging interface for charging a traction battery of a motor vehicle equipped with the bumper, in particular an electric vehicle, is significantly simplified.

One preferred embodiment example of the bumper is characterized in that the adapter frame has a fastening interface facing the bumper and individually customized to the bumper. The adapter frame is advantageously equipped with two fastening points, i.e., the unit point and the customized interface. The adapter frame can be detachably fastened on the inside of the bumper. However, the adapter frame can also be fastened to the interior of the bumper in a bonded manner. Various types of connections can also be used to fasten the adapter frame to the inside of the bumper. Depending on the design, the adapter frame can also be integrally connected to the bumper. Essentially, the unit interface is arranged so that the combined drive-and-guide device can be mounted without any adjustment to the drive-and-guide device. Doing so significantly simplifies the representation of a charging interface on various bumpers.

Another preferred embodiment example of the bumper is characterized in that the adapter frame surrounds the charging port on the inside of the bumper. The adapter frame is advantageously designed so that the adapter frame completely encompasses the charging port on the inside of the bumper. The stability of the bumper in the area of the charging port can thereby be designed effectively.

Another preferred embodiment example of the bumper is characterized in that the combined drive-and-guide device is integrated into a charging tray module with a housing comprising a housing tray fastened to the unit fastening point of the individually customized adapter frame. The design effort for representing a charging interface in or on a bumper of a motor vehicle can thus be significantly reduced.

Another preferred embodiment example of the bumper is characterized in that the charging tray module comprises a through-hole that can be closed by the cover and that serves to display the charging port. This through-hole in one respect enables the insertion of a charging cable. In addition, the through-hole is advantageously used to receive a charging case which is used to depict the charging interface in combination with the plug-in charging cable. The charging tray module simplifies the implementation of a convenient charging process on the bumper of the motor vehicle.

A further preferred embodiment example of the bumper is characterized in that the housing tray has a fastening frame that surrounds the cover which, in its closed position, is attached to a movable support frame. As a result, complete closure of the charging port is enabled with the cover in its closed position.

Another preferred embodiment example of the bumper is characterized in that the housing tray is fixed to the adapter frame with the fastening frame. Doing so significantly simplifies the fastening of the charging tray module in the bumper.

Another preferred embodiment example of the bumper is characterized in that the housing tray with its fastening frame is positioned on the adapter frame. For this purpose, positioning means such as positioning pins can, e.g., be provided on the adapter frame, onto which the fastening frame of the housing tray is fitted. The housing tray positioned in this way can be fastened quickly and easily to the adapter frame, and/or optionally also to the bumper.

Also described and shown in FIG. 4 is a bumper modular system with variously designed bumper variants, all of which have the features of a bumper described hereinabove and, only by means of the individually customized adapter frame, are all equipped with the same drive-and-guide device, in particular the same charging tray module. The platform concept can thus be easily achieved with various motor vehicle variants.

The invention further relates to an adapter element and/or a combined drive-and-guide device, in particular a charging tray module or a housing tray, for a charging connector apparatus as described hereinabove. The specified parts can be purchased separately.

BRIEF DESCRIPTION OF THE DRAWINGS

Further advantages, features, and details of the invention arise from the following description, in which various embodiment examples of the invention are described in detail with reference to the drawings. Shown are.

DETAILED DESCRIPTION OF THE INVENTION

Figure 1:
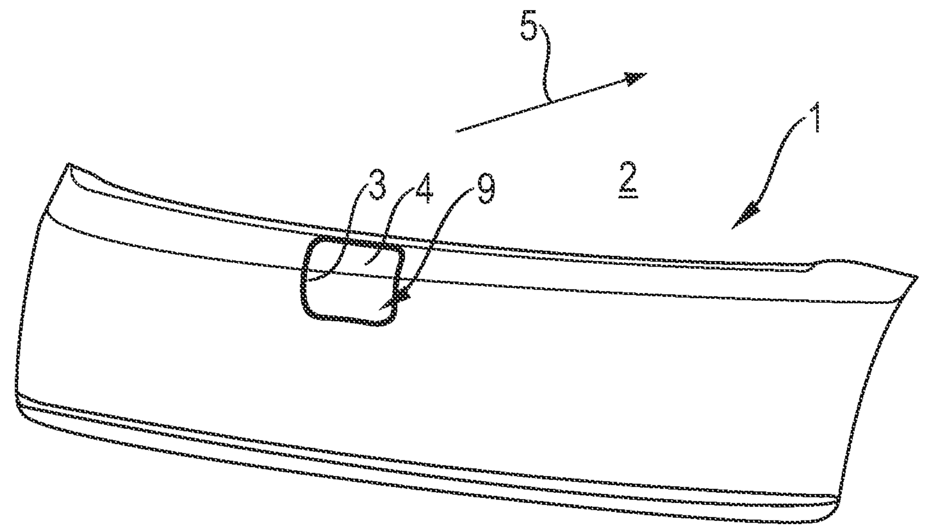
FIG. 1 is a perspective view of a bumper with a charging port, which is closed by a cover.

FIG. 1 shows a perspective view of a bumper 1 of a motor vehicle 2 (indicated only by a reference character). A forward direction of travel of the motor vehicle 2 is indicated in FIG. 1 by an arrow 5.

The bumper 1 is a rear bumper of the motor vehicle 2. The motor vehicle 2 is an electric vehicle that can be recharged with a charging cable (not shown) via a charging port 3. In FIG. 1, the charging port 3 is closed by a cover 4, which can also be referred to as a charger cover.

Figure 2:
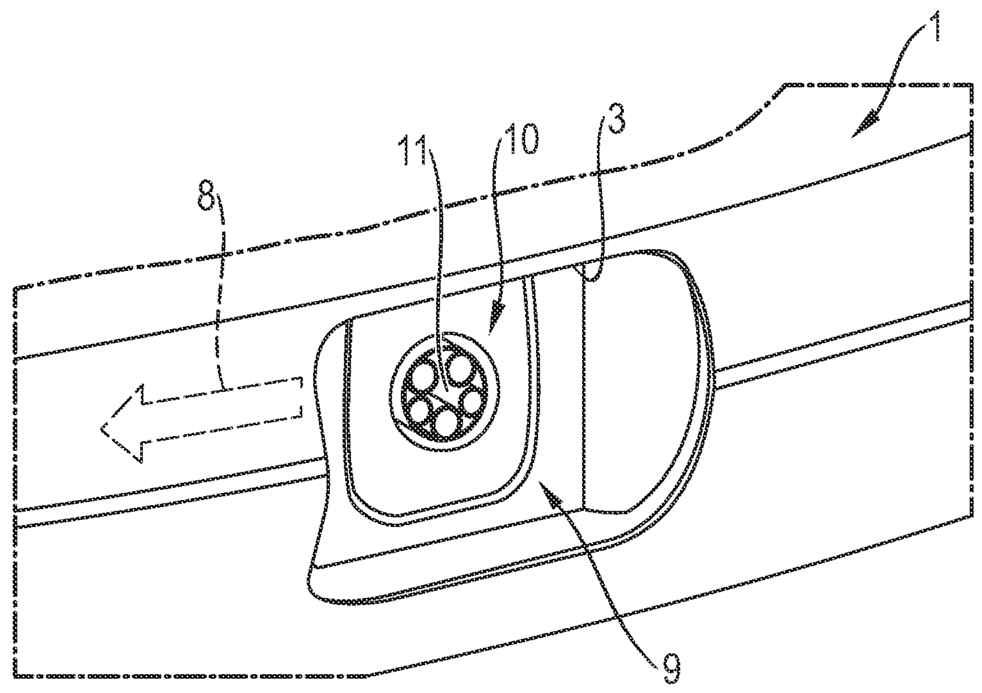
FIG. 2 depicts the charging port on the bumper of FIG. 1 in an opened state.

In FIG. 2, an excerpt of the bumper 1 from FIG. 1 with the charging port 3 opened (shown in an enlarged view). In FIG. 2, an opening movement is indicated by an arrow 8, via which the cover bearing designated with 4 in FIG. 1 is moved from its closed position shown in FIG. 1 into its open position. In its open position, the cover 4 is not visible in FIG. 2. In the open position of the cover 4, the charging port 3 is fully exposed.

In FIG. 2, it can be seen that a charging socket 10 with a mating face 11 is arranged in the bumper 1 behind the opened charging port 3. The charging socket 10 with the mating face 11 serves as a charging interface or charging connector apparatus 9 on the motor vehicle 2. This charging interface is accessible on the motor vehicle 2 through the charging port 3 in the is bumper 1.

Figure 3:
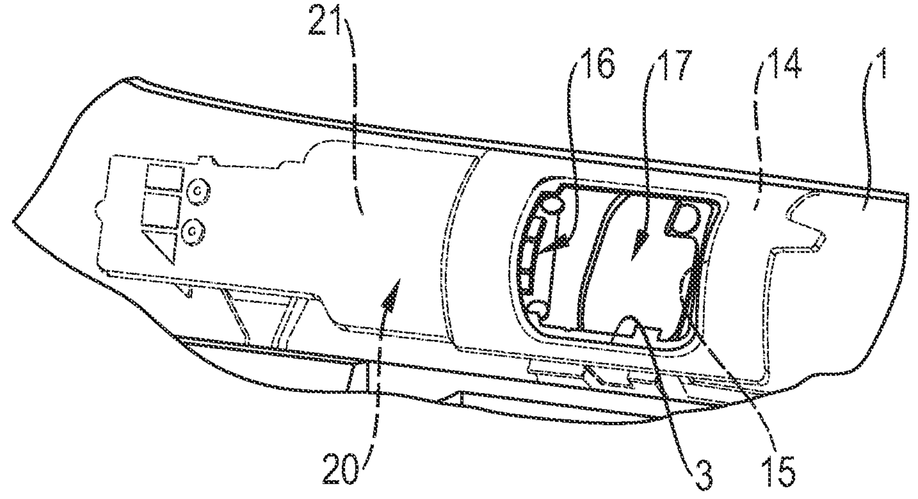
FIG. 3 is a transparent view of the bumper of FIGS. 1 and 2 with a drive-and-guide device fastened in the region of the charging port in the bumper.

In FIG. 3, a detail of the bumper 1 with the charging port 3 is shown in a transparent view. In this illustration, it can be seen that a drive-and-guide device 16 is integrated into the bumper 1. The drive-and-guide device 16 is integrated into a charging tray module 20 with a housing tray 36.

In the bumper 1, the drive-and-guide device 16 is used in order to move the cover 4 (also referred to as the charger cover) from its closed position shown in FIG. 1 into its open position, as indicated in FIG. 2, and vice versa. The cover or charger cover 4 can be automatically retracted inwardly, being electrically driven out of its closed position shown in FIG. 1 by means of the drive-and-guide device 16, as indicated in FIG. 2 by the arrow 8.

For this purpose, the drive-and-guide device 16 is equipped with an electromotive drive. Via a suitable guiding device, a rotational movement of the electromotive drive is, e.g., converted into corresponding opening movements and closing movements of the cover 4.

The drive-and-guide device 16 can be fastened directly inside the bumper 1. In the region of the charging port 3, an adapter frame 14 is fastened on the inside of the bumper 1. The adapter frame 14 comprises a port 15, through which the charging port 3 is enclosed in the bumper 1. The drive-and-guide device 16 is fastened to the adapter frame 14 in the region of the charging port 3.

The fastening of the drive-and-guide device 16 to the adapter frame 14 is, e.g., performed in a bonded manner, in particular by adhesion. Alternatively or additionally, the drive-and-guide device 16 is screwed onto the adapter frame 14. The adapter frame 14 is fastened on the inside of the bumper 1. This fastening can also be produced in a bonded manner and/or with the aid of fastening means, such as screws.

The bumper 1 with the adapter frame 14 and the drive-and-guide device 16 represents an assembly which is, e.g., assembled by a supplier. The adapter frame 14, the drive-and-guide device 16, and the bumper 1 can be manufactured at different production sites. Assembly is then, e.g., performed by the supplier. The fully assembled unit can then be delivered to a vehicle manufacturer.

The charging socket 10, visible in FIG. 2 through the opened charging port 3 and with the mating face 11, is fastened to a support structure of the motor vehicle 2. When assembling the assembly supplied by the supplier, said structure is attached with an assembly port 17 via the charging socket 10 with the mating face 11. Once the assembly is correctly positioned relative to the charging socket 10 with the mating face 11, the bumper 1 can be attached to the support structure of the motor vehicle 2.

The bumper 1 and the adapter frame 14 are advantageously made of a plastic material. A housing of the drive-and-guide device 16 is also advantageously made of a suitable plastic material.

Figure 4:
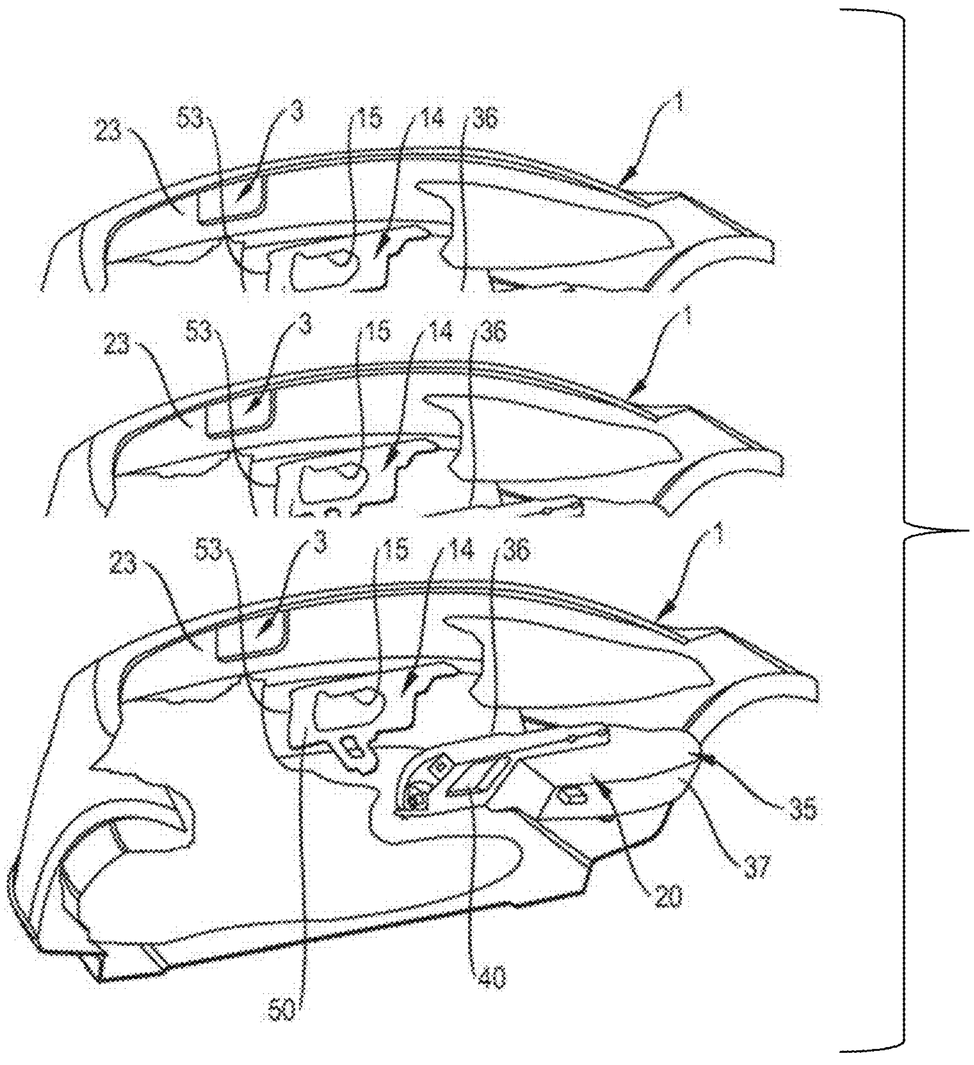
FIG. 4 is a detailed perspective view of the bumper with a charging tray module and an adapter frame, wherein the bumper is shown amongst other bumpers forming a bumper modular system.

In FIG. 4, it is illustrated how the charging tray module 20 with the drive-and-guide device integrated therein for the cover is mounted on the inside of the bumper 1. The charging tray module 20 can be fastened directly inside the bumper 1, e.g., in a bonded manner and/or with the aid of suitable fastening means. It is shown in FIG. 4 that an adapter frame 14 can also be used on the inside of the bumper 1 in order to fasten the charging tray module 20.

The adapter frame 14 is advantageously equipped on one side with a unit fastening point 50, at which the charging tray module 20 can be quickly and easily positioned and fastened. On a side facing away from the unit fastening point 50, the adapter frame 14 has a fastening interface 53 that is customized to the bumper 1.

The adapter frame 14 provides the advantage that the same charging tray module 20 can be used for various bumpers or bumper variants. The fastening interface 53 of the adapter frame 14 thereby need only be customized to the respective bumper or the respective bumper variant. Nothing need be changed on the charging tray module 20.

The adapter frame 14 comprises a port 15, which also serves as the charging port 3. The charging tray module 20 comprises a through-hole 40, which also serves as the charging port 3. A charging socket designated with 10 in FIG. 2 is, e.g., attached to the charging tray module 20, which can be exposed or covered with the aid of the cover.

The charging tray module 20 comprises a housing 35 with a housing tray 36 and a housing is rear wall 37. The through-hole 40 extends through the housing 35 with the housing tray 36 and the housing rear wall 37. The charging tray module 20 with its housing tray 36 is mounted directly or indirectly with the interposition of the adapter frame 14 on the inside of an outer skin 23 of the bumper 1.

In contrast to what is shown, the charging tray module 20 can also be mounted at another location of the outer skin 23 of a motor vehicle or a motor vehicle body. The charging tray module 20 can also in this case be fastened to a body of the motor vehicle, either directly or indirectly with the interposition of the adapter frame 14.

Figure 5:
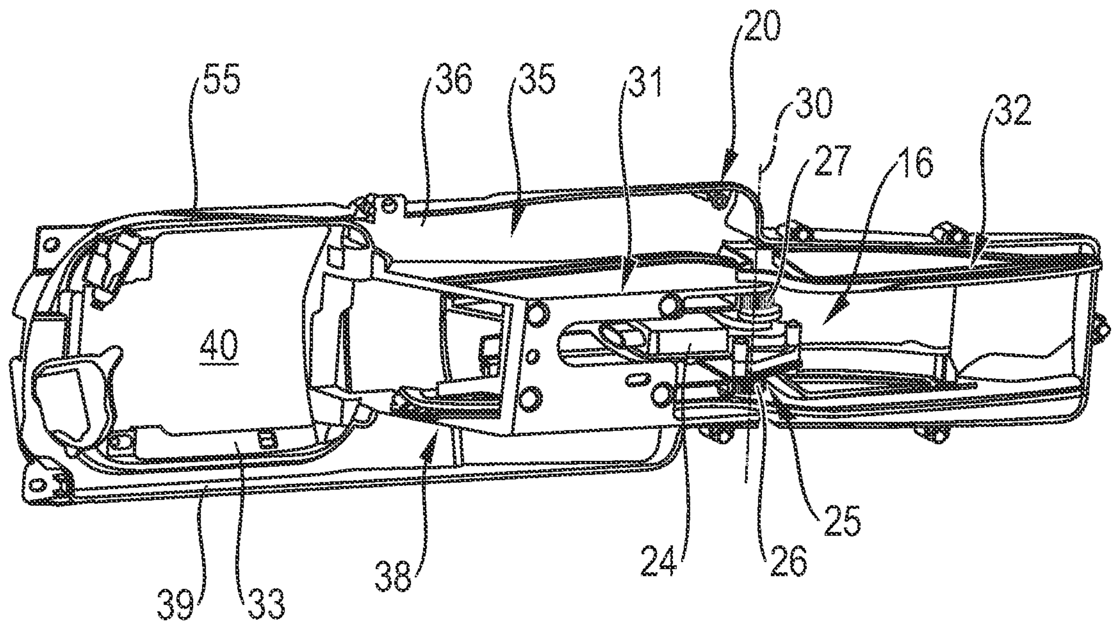
FIG. 5 is a perspective view of a drive-and-guide device for the cover integrated into the charging tray module.

In FIG. 5, the charging tray module 20 is shown in a perspective view, without the housing rear wall 37, in order to illustrate the arrangement of the combined drive-and-guide device 16 in the housing 35 of the charging tray module 20. The drive-and-guide device 16 with its housing-fixed components is fixed to the housing tray 36, which is also referred to as the charging tray. The name "charging tray module" comes from the term "charging tray."

The drive-and-guide device 16 integrated into the charging tray module 20 comprises a gearwheel/rack combination 25 with two gearwheels 26, 27 and two racks 28, 29. The two gearwheels 26, 27 are electromotively driven about a common axis of rotation 30, e.g. by an electromotor 24, which is integrated into the charging tray module 20. The electromotor 24 is fastened internally on the housing tray 36.

Figure 6:
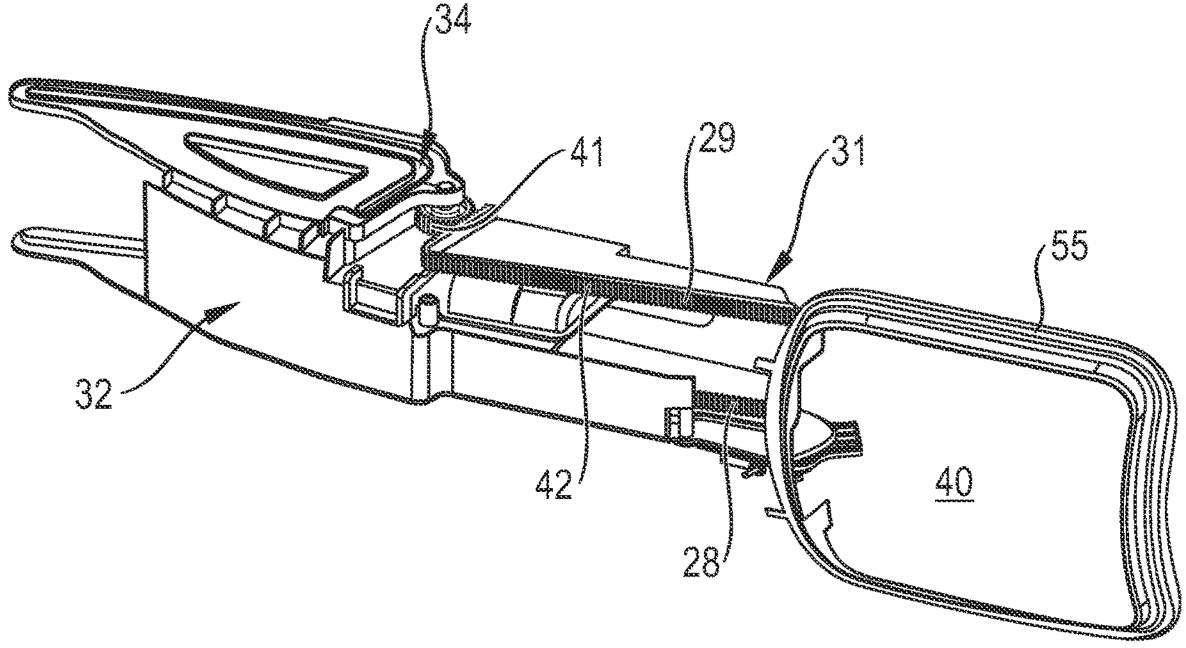
FIG. 6 is a perspective view of the combined drive-and-guide device of FIG. 5, but without a housing tray and without a support frame, as well as from a different perspective.

In FIG. 6, two racks 28, 29 of the gearwheel/rack combination 25 are visible. The two racks 8 and 29 each comprise a lifting portion 41 and a pushing portion 42. The lifting portion 41 is arranged substantially perpendicular to the pushing portion 42. The lifting portion 41 is used for a lifting movement of the cover 4. The pushing portion 42 serves for a pushing movement or translational movement of the cover 4.

The gearwheel 26 meshes with the rack 28. The gearwheel 27 meshes with the rack 29. A rotational movement of the gearwheels 26, 27 moves a movable guiding component 31 of the drive-and-guide device 16 relative to a housing-fixed guiding component 32.

The movable guiding component 31 comprises a support frame 33 to which the racks 28 and 29 are attached. The housing-fixed guiding component 32 comprises the electromotor 24. Relative movements of the movable guiding component 31 relative to the housing-fixed is guiding component 32 are guided through a double slotted guide 34.

The housing 35 of the charging tray module 20 comprises a receptacle space 38 for the movable guiding component 31 with the support frame 33 and the cover 4. The receptacle space 38 is in this case designed and dimensioned such that the movable guiding component 31 can perform the movements without interference when the cover 4 moves between its open position and its closed position.

A frame 55 for the cover 4 is attached to one end of the support frame 33. This frame 55 is arranged in a fastening frame 39 formed on the housing tray 36.

The support frame 33, the fastening frame 39, and the frame 55 for the cover 4 comprise a through-hole 40, which is used as the charging port (designated with 3 in FIG. 1) in the outer skin 23 and in the bumper 1. When the cover 4 is in its closed position, the through-hole 40 is closed. In its open position, the cover 4 exposes the through-hole 40.

REFERENCE CHARACTERS

1 Bumper
2 Motor vehicle
3 Charging port
4 Cover
5 Forward direction of travel
8 Opening movement
9 Charging interface or charging connector apparatus
10 Charging socket
11 Mating face
14 Adapter frame
15 Port
16 Drive-and-guide device
17 Assembly port
20 Charging tray module
23 Outer skin
24 Electric motor
25 Gearwheel/rack combination
26 Gearwheel
27 Gearwheel
28 Rack
29 Rack
30 Axis of rotation
31 Movable guiding component
32 Housing-fixed guidance component
33 Support frame
34 Double slotted guide
35 Housing
36 Housing tray
37 Housing rear wall
38 Receptacle space
39 Fastening frame
40 Through-hole
41 Lifting portion
42 Pushing portion
50 Unit fastening point
53 Fastening interface
55 Frame

What is claimed is:

1. A bumper comprising:

a charging port formed in the bumper, a cover that is selectively moveable relative to the charging port, and a combined drive-and-guide device arranged in the bumper for moving the cover between a closed position in which the charging port is covered by the cover and an open position in which the charging port is exposed by the cover, wherein the combined drive-and-guide device is fastened to the bumper on a unit fastening point of an individually configured adapter frame facing the combined drive-and-guide device, wherein the combined drive-and-guide device is integrated into a charging tray module with a housing comprising a housing tray fastened to the unit fastening point of the individually configured adapter frame.

2. The bumper according to claim 1, wherein the adapter frame has a fastening interface facing the bumper and individually configured to the bumper.

3. The bumper according to claim 1, wherein the adapter frame surrounds the charging port on an inside of the bumper.

4. The bumper according to claim 1, wherein the charging tray module comprises a through-hole that is configured to be closed by the cover and that is used to display the charging port.

5. The bumper according to claim 1, wherein the housing tray has a fastening frame that surrounds the cover which, in the closed position, is attached to a movable support frame.

6. The bumper according to claim 5, wherein the housing tray is fixed to the adapter frame.

7. The bumper according to claim 5, wherein the housing tray is positioned on the adapter frame.

8. A modular bumper system comprising:

a plurality of differently designed bumpers, wherein each bumper of the plurality of differently designed bumpers comprises a charging port, a cover that is selectively moveable relative to the charging port, and a combined drive-and-guide device arranged in the bumper for moving the cover between a closed position in which the charging port is covered by the cover and an open position in which the charging port is exposed by the cover, wherein the combined drive-and-guide device is fastened to the bumper on a unit fastening point of an individually configured adapter frame facing the combined drive-and-guide device, and wherein all of the differently designed bumpers are equipped with the same drive-and-guide device.

* * * * *